R. Maffett,
Converting Motion.

N° 14,568.   Patented Apr. 1, 1856.

R. Maffett,
Converting Motion.
N° 14,568. Patented Apr. 1 1856.
2 Sheets-Sheet 2.
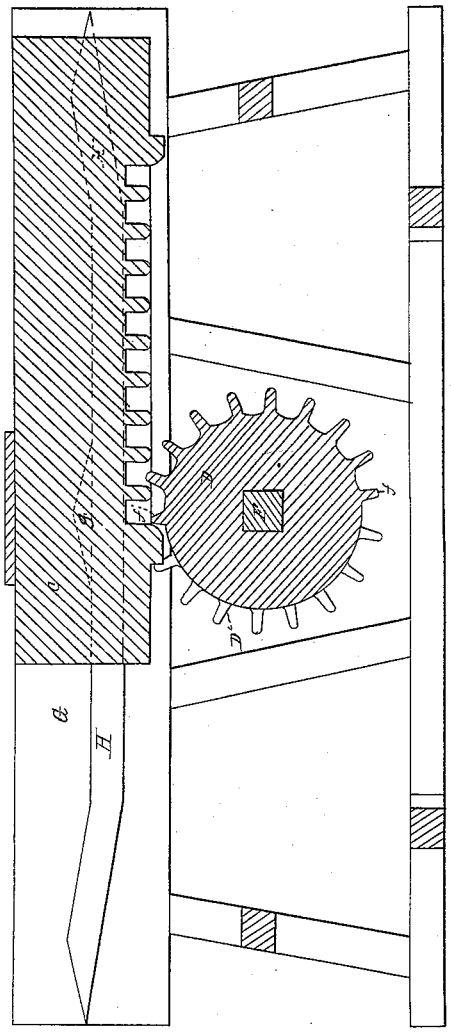

UNITED STATES PATENT OFFICE.

ROBERT MAFFETT, OF BRADFORD, PENNSYLVANIA.

METHOD OF CONVERTING RECIPROCATING INTO ROTARY MOTION.

Specification of Letters Patent No. 14,568, dated April 1, 1856.

*To all whom it may concern:*

Be it known that I, ROBERT MAFFETT, of Bradford, in the county of McKean and State of Pennsylvania, have invented a new and useful Improvement in Mode of Changing Reciprocating to Rotary Motion; and I do hereby declare that the following is a full, clear, and exact description of the construction and operation of the same, reference being had to the annexed drawing, forming part of this specification, in which—

Figure 1:
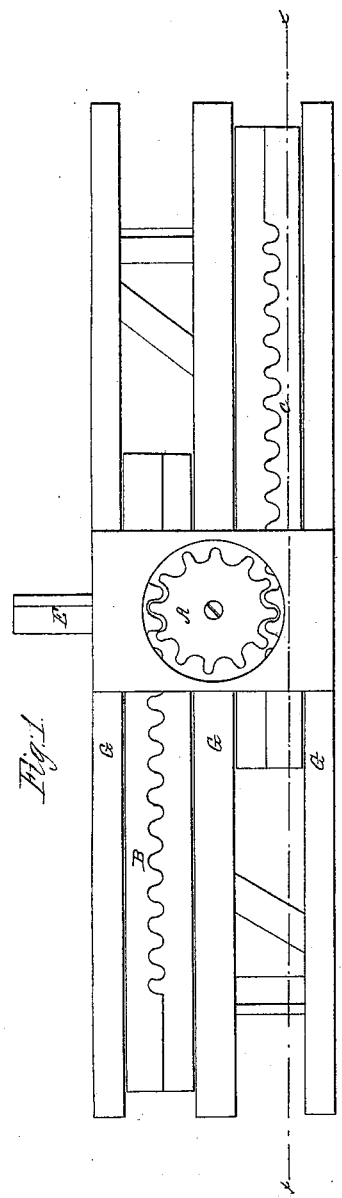
Figure 2:
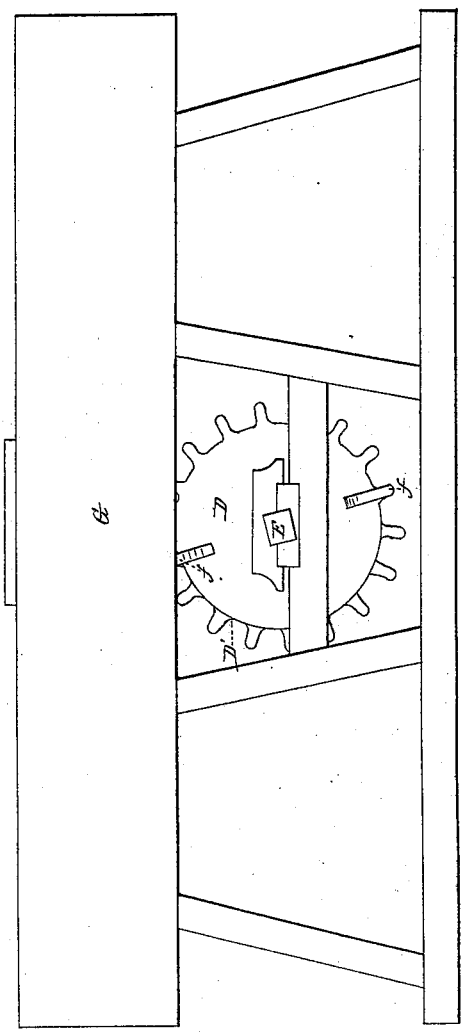

Figure 1 is a plan, showing piston racks. Fig. 2 is a side elevation showing semi-cogged pinion D and teeth of D'. Fig. 3 is a vertical section on line $x$ $x$ of Fig. 1, showing piston rack, groove guide and relative position of pinions D D'. Fig. 4 is a side elevation of piston rack showing the lozenge projections on which the groove guides act, and the side rack meshing with the upper pinion.

Similar letters denote the same part in all the figures.

The invention here considered refers to the production of a continuous rotary motion of a shaft by the alternate meshing of opposite semi-cogged pinions upon said shaft with opposite moving piston rack.

It consists in the method of disengaging the teeth of one pinion at the end of the stroke, and the bringing into action the teeth of the other pinion on the return stroke, by means of guide grooves in the cheeks between which the racks reciprocate, and lozenge projections on the sides of said racks moving in said guide grooves, in connection with elevating projections upon the pinions; so that at the termination of an operating stroke of one rack it will be lifted upward and on the return stroke of the other rack it will be drawn into the teeth of the pinion with which it acts; the entire action being as follows.

In the drawing B and C are the piston racks of opposite moving pistons with which they are connected by rods. These racks reciprocate in opposite directions between the cheek pieces G, in which are the grooves H in form as shown in Fig. 3. Lozenge projections L (Fig. 4) on the sides of the piston racks filling said grooves, and producing the elevation of the front extremity of the rack at the end of each stroke.

D D' are the semi-cogged pinions on shaft E, the teeth of which have the relative position shown in the drawing, usual in this construction. The extreme teeth of each pinion are but half the length of the other teeth and have a projection laterally as at $f$ $f'$, so that at the termination of the stroke these side projections will lift the rear extremity of the rack; causing the rear lozenge projection to enter and fill inclined cavity $g$, of groove H. It should be here mentioned that the racks are inclosed on each side by a rim on the lower edge of which the projections $f$ $f'$ act. The inner faces of the piston racks B C are also toothed and mesh with a pinion A as shown in Fig. 1.

The operation of my improvement is as follows: The piston racks reciprocating in opposite directions, as above premised, the teeth of one of the pinions will mesh with the teeth of one of these racks, producing the rotation of the shaft E. As the extreme of each rack nears the end of its stroke, the forward lozenge projection L gradually rises up the incline of the guide groove H, lifting the front end of each rack. At the termination of the stroke the latent projection, $f$ or $f'$ of the extreme teeth of the pinions, press upon the edge of the rim inclosing the rack teeth, and lift the rear lozenge into cavity $g$ of groove H. The return stroke of both pistons then commencing, the inclination of cavity $g$ acting on the lozenge L carries the rack downward and causes the second tooth of the pinion to engage the rack opposite to that previously in action and thus continue the rotation of shaft E in the same direction. The first rack being drawn down upon the blank portion of its pinion and thereby returning inactive. The upper rack teeth meshing with pinion A enables the back stroke of the free rack to aid the operating rack. This however I do not claim.

I am aware that opposite semi-toothed pinions have before been used, in combination with racks, for converting reciprocating into rotary motion; I therefore make no claim to such; neither do I claim the use of guide grooves, and lugs on the racks by themselves, but What I do claim as my invention, and desire to secure by Letters Patent, is—

The arrangement of the laterally projecting lifting teeth $f$, $f$ on the semi-pinions, in combination with the guide grooves H, and lozenge-projections L, substantially as above described.

ROBERT MAFFETT.

Witnesses:
JOHN S. HOLLINGSHEAD,
THOS. C. WHEELER.